(12) United States Patent
Sims

(10) Patent No.: US 9,385,589 B2
(45) Date of Patent: Jul. 5, 2016

(54) MANAGEMENT OF COMMON MODE NOISE FREQUENCIES IN PORTABLE ELECTRONIC DEVICES

(75) Inventor: Nicholas A. Sims, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1198 days.

(21) Appl. No.: 13/296,392

(22) Filed: Nov. 15, 2011

(65) Prior Publication Data

US 2013/0121031 A1 May 16, 2013

(51) Int. Cl.
| | |
|---|---|
| H02M 3/22 | (2006.01) |
| H02M 1/44 | (2007.01) |
| H02M 3/335 | (2006.01) |
| G06F 1/26 | (2006.01) |
| G06F 3/041 | (2006.01) |

(52) U.S. Cl.
CPC . *H02M 1/44* (2013.01); *G06F 1/26* (2013.01); *G06F 1/263* (2013.01); *G06F 3/0418* (2013.01); *H02M 3/33507* (2013.01)

(58) Field of Classification Search
CPC ........................................................ H02M 3/22
See application file for complete search history.

(56) References Cited

U.S. PATENT DOCUMENTS

| | | | | | |
|---|---|---|---|---|---|
| 6,633,932 | B1 * | 10/2003 | Bork | ........................ | G06F 1/266 320/107 |
| 7,869,228 | B2 * | 1/2011 | Qahouq | ................... | G06F 1/206 323/282 |
| 8,386,814 | B2 * | 2/2013 | Tom | ......................... | G06F 1/266 307/151 |
| 8,890,854 | B2 * | 11/2014 | Tenuta | ................... | G06F 3/0418 178/18.06 |
| 9,122,325 | B2 * | 9/2015 | Peshkin | .................... | G06F 3/016 |
| 2005/0174094 | A1 * | 8/2005 | Purdy | ...................... | H02J 7/052 320/134 |
| 2005/0191966 | A1 * | 9/2005 | Katsuta | ............... | B60C 23/0418 455/68 |
| 2007/0143636 | A1 * | 6/2007 | Bailey | ....................... | H02J 1/00 713/300 |
| 2008/0059661 | A1 * | 3/2008 | Akahane | ............. | G06F 13/4081 710/18 |
| 2008/0198898 | A1 * | 8/2008 | Taylor | ...................... | G01K 7/16 374/163 |
| 2011/0096012 | A1 * | 4/2011 | Park | ....................... | G06F 3/0416 345/173 |
| 2013/0044265 | A1 * | 2/2013 | Sasaki | .................. | H04B 15/005 348/731 |

* cited by examiner

*Primary Examiner* — Emily P Pham
(74) *Attorney, Agent, or Firm* — Blank Rome LLP

(57) ABSTRACT

The disclosed embodiments provide a system that facilitates the use of a portable electronic device. During operation, the system detects a coupling of a power supply to the portable electronic device through a set of wires. Next, the system uses the set of wires to identify a type of the power supply. The system then periodically determines a switching frequency of the power supply based on the type of the power supply and a current drawn from the power supply. Finally, the system uses the switching frequency to facilitate the operation of a touch control in the portable electronic device. For example, if the switching frequency corresponds to a sensing frequency of the touch control, the system may change the sensing frequency to an alternative sensing frequency.

27 Claims, 6 Drawing Sheets

MANAGEMENT OF COMMON MODE NOISE FREQUENCIES IN PORTABLE ELECTRONIC DEVICES

BACKGROUND

1. Field

The present embodiments relate to power supplies for portable electronic devices. More specifically, the present embodiments relate to techniques for managing common mode noise frequencies generated by power supplies for portable electronic devices.

2. Related Art

Flyback converters may be used to convert alternating current (AC) to direct current (DC) in low-power applications such as mobile phone chargers and/or laptop computer power supplies. For example, an external power supply (e.g., power brick) for a laptop computer may use a flyback converter to convert AC mains power from a power outlet into low-voltage DC that can be used by components in the laptop computer.

To increase the efficiency of a flyback converter, the switching frequency of the flyback converter may be varied in response to load and/or input voltage. For example, a moving load generated by a charging battery and/or the switching off of a touchscreen in a mobile phone may cause the switching frequency of the mobile phone's charger to sweep across a range of frequencies, thus lowering switching losses in the flyback converter.

On the other hand, dynamic changes to the flyback converter's switching frequency may generate common mode noise that interferes with the sensing of touch input on a portable electronic device coupled to the flyback converter. For example, the flyback converter's switching frequency may sweep through a frequency band associated with the sensing frequency of a touch control on the portable electronic device. While the switching frequency remains in the frequency band, common mode interference from the flyback converter may prevent the touch control from accurately detecting touch input on the portable electronic device. As a result, efficient operation of the flyback converter may reduce the performance of the touch control and negatively impact the user experience with the portable electronic device.

Hence, what is needed is a mechanism for managing the frequencies of common mode noise generated by power supplies of portable electronic devices.

SUMMARY

The disclosed embodiments provide a system that facilitates the use of a portable electronic device. During operation, the system detects a coupling of a power supply to the portable electronic device through a set of wires. Next, the system uses the set of wires to identify a type of the power supply. The system then periodically determines a switching frequency of the power supply based on the type of the power supply and a current drawn from the power supply. Finally, the system uses the switching frequency to facilitate the operation of a touch control in the portable electronic device. For example, if the switching frequency corresponds to a sensing frequency of the touch control, the system may change the sensing frequency to an alternative sensing frequency.

In some embodiments, using the set of wires to identify the type of the power supply involves obtaining an identifier corresponding to the type from an analog-to-digital converter (ADC) coupled to the wires. The identifier may be calculated by the ADC using one or more voltage dividers.

In some embodiments, periodically determining the switching frequency of the power supply based on the type of the power supply and the current drawn from the power supply involves using the identifier and the current to obtain the switching frequency from a lookup table.

In some embodiments, the set of wires includes a power wire, one or more data wires, and a ground wire.

In some embodiments, the touch control is associated with at least one of a touchscreen and a touchpad.

The disclosed embodiments also provide a system that operates a power supply for a portable electronic device. During operation, the system establishes a communications link between the power supply and the portable electronic device. Next, the system uses the communications link to identify a type of the portable electronic device and uses the type of the portable electronic device to determine a set of sensing frequencies for a touch control of the portable electronic device. Finally, the system manages a switching frequency of the power supply based on the sensing frequencies to reduce common mode noise associated with sensing touch input on the portable electronic device.

In some embodiments, the system also temporarily halts operation of the power supply upon receiving a halt command from the portable electronic device to the power supply, wherein the halted operation further reduces common mode noise associated with sensing touch input on the portable electronic device. The system may then resume operation of the power supply upon receiving a resume command from the portable electronic device to the power supply.

In some embodiments, using the type of the portable electronic device to determine the set of sensing frequencies for the touch control involves using the type of the portable electronic device to obtain the set of sensing frequencies from a lookup table.

In some embodiments, managing the switching frequency of the power supply based on the sensing frequencies to reduce common mode noise associated with sensing touch input on the portable electronic device involves modulating the switching frequency so that the power supply avoids frequency bands associated with the sensing frequencies.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
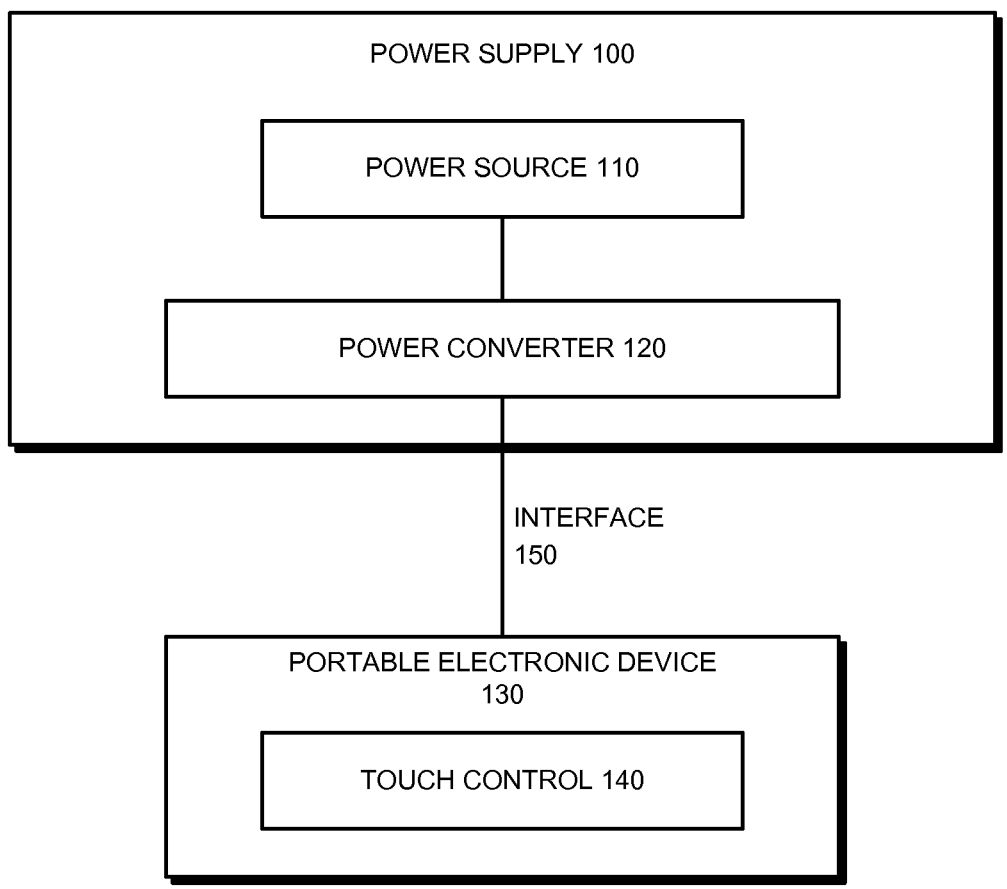
FIG. 1 shows a schematic of a system in accordance with the disclosed embodiments.

The disclosed embodiments provide a method and system for facilitating use of a portable electronic device and/or a power supply for the portable electronic device. As shown in FIG. 1, the power supply 100 includes a power source 110 and a power converter 120. Power converter 120 may obtain an input voltage from power source 110 and convert the input voltage into an output voltage that is used to drive a load in the portable electronic device 130. For example, power converter 120 may convert alternating current (AC) mains power into low-voltage direct current (DC) that is used to charge a battery and/or power components of a mobile phone, laptop computer, portable media player, and/or tablet computer.

Furthermore, power supply 100 may be designed to accommodate size constraints associated with portable electronic device 130. For example, the small form factor of portable electronic device 130 may require the design of a similarly small power supply 100 for use with portable electronic device 130. Moreover, gradual reductions in the size and/or weight of portable electronic device 130 over time may be accompanied by corresponding reductions in the size and/or weight of power supply 100 to further improve the portability of portable electronic device 130.

Conversely, such size constraints may result in power losses that reduce the efficiency of power supply 100. In particular, power conversion in power supply 100 may involve a tradeoff between size and efficiency, in which larger electronic components (e.g., transformers, inductors, etc.) may generate a given output voltage at a lower switching frequency, and thus dissipate less power, than smaller electronic components. Because a small form factor for power supply 100 may require the use of small electronic components within power converter 120, power supply 100 may be associated with higher switching losses than a power supply with larger electronic components.

To mitigate switching losses in power supply 100, the switching frequency of power converter 120 may be varied in response to changes in load (e.g., from portable electronic device 130) and/or input voltage (e.g., from power source 110). For example, the charging of a battery in portable electronic device 130 and/or the powering on or off of a component (e.g., processor, touchscreen, speakers, etc.) in portable electronic device 130 may cause the switching frequency of power converter 120 to sweep across frequencies ranging between 100 KHz and 400 KHz.

However, dynamic changes to the switching frequency of power converter 120 may also generate common mode noise that interferes with the operation of a touch control 140 in portable electronic device 130. More specifically, the switching frequency may sweep through a frequency band associated with the sensing frequency of touch control 140, thus interfering with the ability of touch control 140 to accurately detect touch input on portable electronic device 130.

In one or more embodiments, power supply 100 and/or portable electronic device 130 include functionality to facilitate the operation of touch control 140 by reducing common mode noise associated with sensing touch input on portable electronic device 130. An interface 150 between power supply 100 and portable electronic device 130 may be used by portable electronic device 130 to identify a type of power supply 100 and/or by power supply 100 to identify a type of portable electronic device 130. The identified type(s) may then be used by portable electronic device 130 and/or power supply 100 to determine the switching frequency of power supply 100 and/or a set of sensing frequencies for touch control 140, respectively. Finally, the switching and/or sensing frequencies may be adjusted by power supply 100 and/or portable electronic device 130, respectively, to facilitate operation of touch control 140. For example, portable electronic device 130 may change the sensing frequency of touch control 140 to an alternative sensing frequency if the switching frequency corresponds to the current sensing frequency of touch control 140. Alternatively, power supply 100 may modulate the switching frequency so that power supply 100 avoids frequency bands associated with the sensing frequencies of touch control 140.

Figure 2:
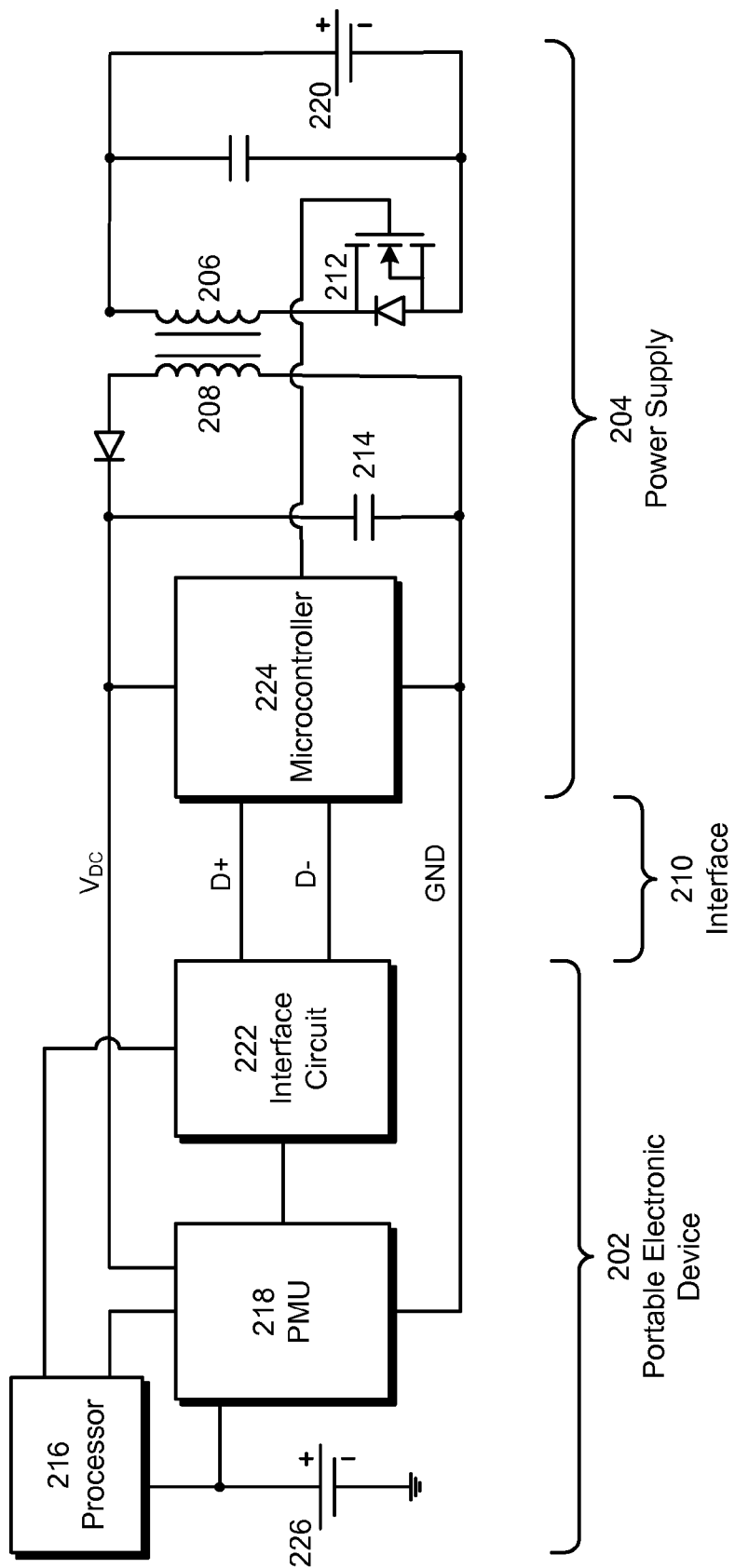
FIG. 2 shows a system for operating a power supply for a portable electronic device in accordance with the disclosed embodiments.

FIG. 2 shows a system for operating a power supply 204 for a portable electronic device 202 in accordance with the disclosed embodiments. Power supply 204 may be coupled to portable electronic device 202 through an interface 210 such as Universal Serial Bus (USB), MagSafe (MagSafe™ is a registered trademark of Apple Inc.), and/or 1-Wire (1-Wire™ is a registered trademark of Maxim Integrated Products, Inc.). In addition, interface 210 may include a set of wires, such as a power wire (e.g., "$V_{DC}$"), a ground wire (e.g., "GND"), and/or one or more data wires (e.g., "D+" and "D−").

As shown in FIG. 2, an input voltage is supplied from a power source 220. For example, the input voltage may be obtained as AC mains power from a power outlet. The input voltage may be converted into an output voltage by the flyback converter, which contains a primary winding 206, a secondary winding 208, and a switch 212. Primary winding 206 and secondary winding 208 may form a transformer, and switch 212 may correspond to a metal-oxide-semiconductor field-effect transistor (MOSFET).

To charge the flyback converter, a microcontroller 224 in power supply 204 may close switch 212. The varying current in primary winding 206 may create a varying magnetic flux in the transformer, resulting in a varying voltage (e.g., "$V_{SEC}$")

in secondary winding 208. Microcontroller 224 may then discharge the flyback converter by opening switch 212. Once switch 212 is opened, current from secondary winding 208 may be collected by a capacitor 214, which supplies the current to portable electronic device 202 and acts as a low-pass filter by reducing voltage ripple caused by fluctuating current through secondary winding 208. A power-management unit (PMU) 218 on the portable electronic device may then use the current to charge a battery 226 on the portable electronic device and/or power processor 216 and/or other components on the portable electronic device.

As mentioned above, the system of FIG. 2 may include functionality to reduce common mode noise associated with sensing touch input on portable electronic device 202. First, a communications link may be established between power supply 204 and portable electronic device 202 through interface 210. For example, processor 216 and/or PMU 218 may establish the communications link over a USB interface 210 with microprocessor 224. Next, microcontroller 224 may use the communications link to identify a type of portable electronic device 202. For example, microcontroller 224 may request the model of portable electronic device 202 from a processor 216 in portable electronic device 202. Processor 216 may then transmit an identifier corresponding to the model to microcontroller 224 via an interface circuit 222 (e.g., USB PHY chip) and interface 210.

Microcontroller 224 may then use the type of portable electronic device 202 to determine a set of sensing frequencies for a touch control of portable electronic device 202. For example, microcontroller 224 may use the type of portable electronic device 202 to obtain the set of sensing frequencies from a lookup table. Finally, microcontroller 224 may manage the switching frequency of power supply 204 (e.g., switch 212) based on the sensing frequencies to reduce common mode noise associated with sensing touch input on portable electronic device 202. For example, microcontroller 224 may modulate the switching frequency so that power supply 204 avoids (e.g., skips) frequency bands associated with the sensing frequencies of the touch control during operation of power supply 204.

To further reduce common mode noise associated with sensing touch input on portable electronic device 202, microcontroller 224 may temporarily halt operation of power supply 204 upon receiving a halt command from portable electronic device 202 to power supply 204 (e.g., through interface 210). During the halted operation, portable electronic device 202 may identify a change in the noise spectrum associated with the sensing frequency of the touch control, thus allowing the touch control to more accurately detect touch input on portable electronic device 202. Microcontroller 224 may then resume operation of power supply 204 upon receiving a resume command from portable electronic device 202 to power supply 204 (e.g., through interface 210). Alternatively, microcontroller 224 may automatically resume operation of power supply 204 after the operation of power supply 204 has been halted for a pre-specified period (e.g., 100 milliseconds).

Those skilled in the art will appreciate that microcontroller 224 may not be present on power supplies for some portable electronic devices, such as mobile phones and/or tablet computers. To facilitate operation of touch controls on such portable electronic devices, the types and switching frequencies of the power supplies may be identified by the portable electronic devices, and the sensing frequencies of touch controls on the portable electronic devices may be changed based on the switching frequencies, as discussed in further detail below with respect to FIG. 3.

Figure 3:
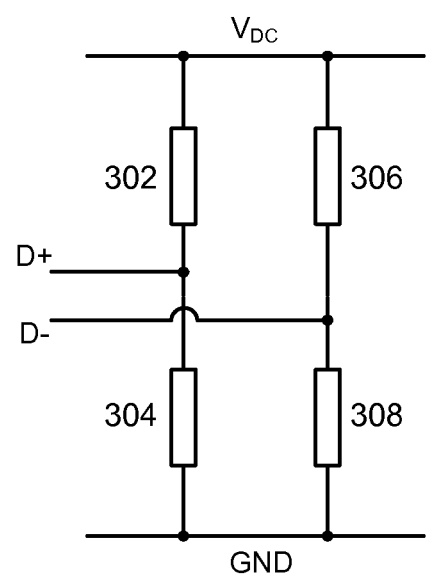
FIG. 3 shows an exemplary circuit for identifying a type of a power supply in accordance with the disclosed embodiments.

FIG. 3 shows an exemplary circuit for identifying a type of a power supply (e.g., power supply 100 of FIG. 1) in accordance with the disclosed embodiments. The power supply may be coupled to a portable electronic device using a set of wires, including a power wire (e.g., "$V_{DC}$"), a ground wire (e.g., "GND"), and one or more data wires (e.g., "D+" and "D−"). In addition, the power supply may lack a microcontroller (e.g., microcontroller 224 of FIG. 2) with functionality to communicate with the portable electronic device. Instead, the circuit of FIG. 3 may be substituted for the microcontroller in the power supply to facilitate the sensing of touch input on the portable electronic device.

In particular, the circuit may include a set of resistors 302-308 forming two voltage dividers. The first voltage divider may include resistors 302-304, and the second voltage divider may include resistors 306-308. The first voltage divider may be used to obtain a first output voltage from the "D+" data wire, and the second voltage divider may be used to obtain a second output voltage from the "D−" data wire.

The output voltages may be used by a management apparatus on the portable electronic device to identify the type of the power supply. For example, a processor (e.g., processor 216 of FIG. 2) and/or PMU (e.g., PMU 218 of FIG. 2) corresponding to the management apparatus may obtain an identifier corresponding to the type from an analog-to-digital converter (ADC) coupled to the wires. The management apparatus may then periodically determine the switching frequency of the power supply based on the type of the power supply and a current drawn from the power supply. Continuing with the above example, the processor and/or PMU may periodically measure the current drawn from the power supply using a sense resistor, using a field-effect transistor (FET), and/or by measuring the voltage drop across a resistor. The processor and/or PMU may then use the identifier obtained from the ADC and the current to obtain the switching frequency from a lookup table.

Finally, the management apparatus may use the switching frequency to facilitate the operation of a touch control in the portable electronic device. For example, the processor and/or PMU may change the sensing frequency of the touch control to an alternative sensing frequency if the switching frequency corresponds to a current sensing frequency of the touch control to allow the touch control to more accurately detect touch input on a touchscreen and/or touchpad of the portable electronic device.

Figure 4:
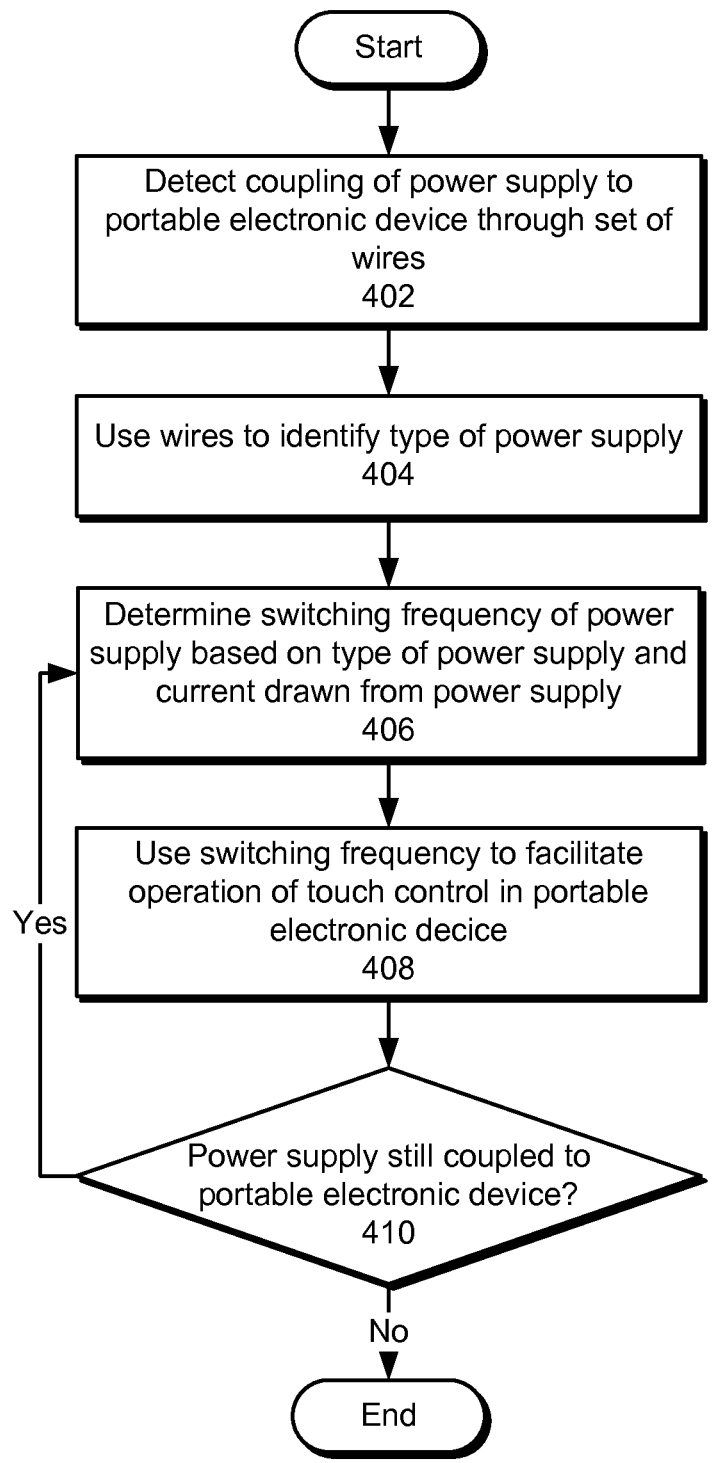
FIG. 4 shows a flowchart illustrating the process of facilitating the use of a portable electronic device in accordance with the disclosed embodiments.

FIG. 4 shows a flowchart illustrating the process of facilitating the use of a portable electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, coupling of a power supply to the portable electronic device is detected through a set of wires (operation 402). The set of wires may form an interface between the power supply and the portable electronic device, such as a USB, MagSafe, and/or 1-Wire interface. Next, the wires are used to identify a type of the power supply (operation 404). For example, an ADC coupled to the wires may use one or more voltage dividers to generate an identifier (e.g., code) corresponding to the type. The ADC may then transmit the identifier to a processor and/or PMU on the portable electronic device.

The switching frequency of the power supply is then determined based on the type of the power supply and the current drawn from the power supply (operation 406). For example, the portable electronic device may use the identifier corresponding to the type and the current to obtain the switching frequency from a lookup table. Finally, the switching frequency is used to facilitate the operation of a touch control in the portable electronic device (operation 408). For example, if the switching frequency corresponds to a sensing frequency of the touch control, the sensing frequency may be changed to an alternative sensing frequency. In turn, the change in sensing frequency may reduce common mode noise associated with sensing touch input on the portable electronic device, thus allowing the touch control to more accurately detect touch input from a touchscreen, touchpad, and/or other touch-sensitive input device on the portable electronic device.

The power supply may continue to be coupled to the portable electronic device (operation 410). For example, the power supply may be coupled to the portable electronic device to charge a battery in the portable electronic device and/or power components of the portable electronic device. During coupling of the power supply to the portable electronic device, the switching frequency of the power supply is periodically determined based on the type of the power supply and the current drawn from the power supply (operation 406). The switching frequency is then used to facilitate the operation of the touch control (operation 408) by, for example, adjusting the sensing frequency of the touch control based on the switching frequency. Such management of common mode noise frequencies in the portable electronic device may continue until the power supply is no longer coupled to the portable electronic device.

Figure 5:
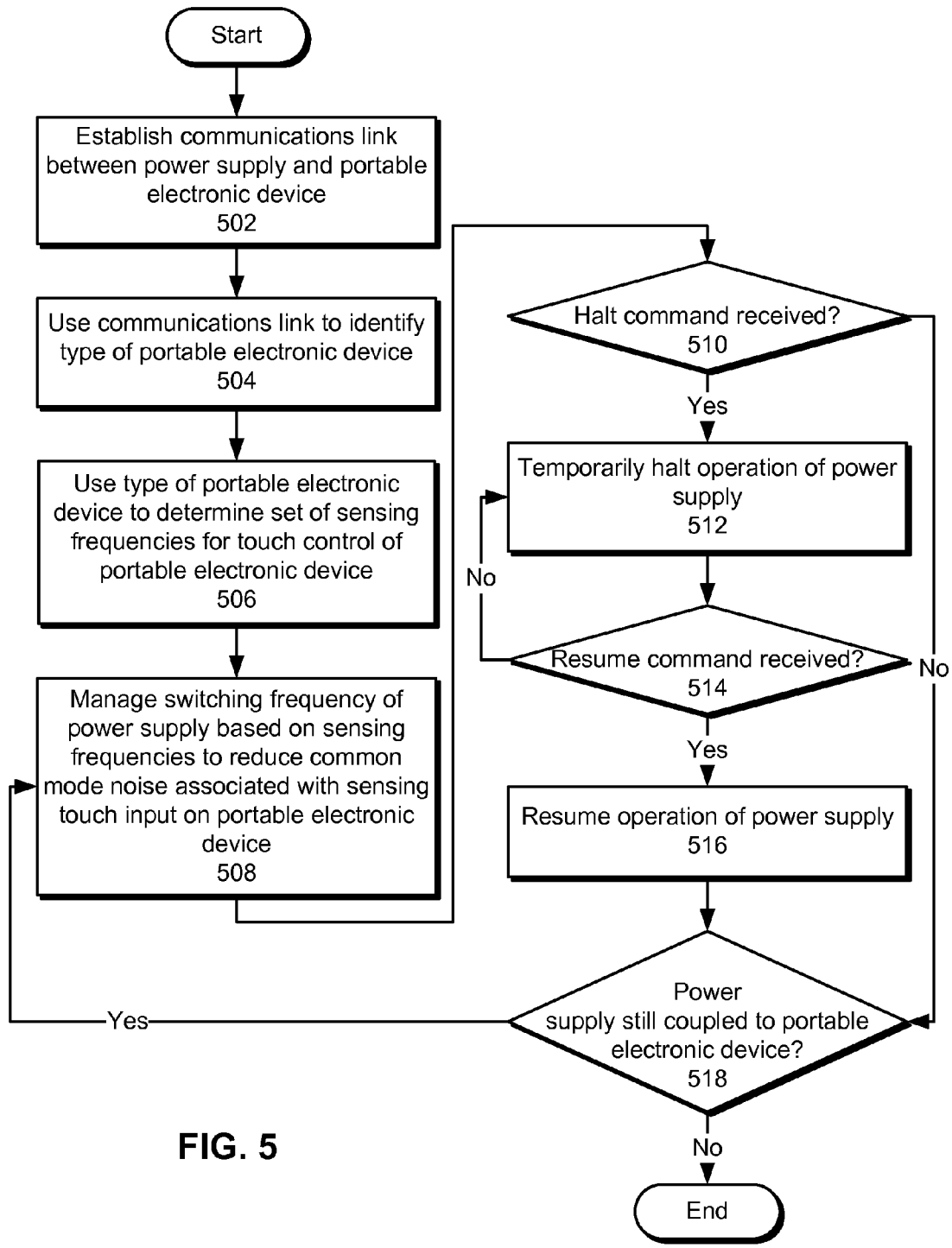
FIG. 5 shows a flowchart illustrating the process of operating a power supply for a portable electronic device in accordance with the disclosed embodiments.

FIG. 5 shows a flowchart illustrating the process of operating a power supply for a portable electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a communications link is established between the power supply and the portable electronic device (operation 502). The communications link may be established through an interface between the power supply and the portable electronic device. Next, the communications link is used to identify a type of the portable electronic device (operation 504), and the type is used to determine a set of sensing frequencies for a touch control of the portable electronic device (operation 506). For example, the power supply may request the type from a processor and/or PMU in the portable electronic device, and the processor and/or PMU may transmit an identifier corresponding to the type to the power supply through the interface. The power supply may then match the identifier to a set of sensing frequencies in a lookup table.

The switching frequency of the power supply is also managed based on the sensing frequencies to reduce common mode noise associated with sensing touch input on the portable electronic device (operation 508). For example, the switching frequency may be modulated so that the power supply avoids frequency bands associated with the sensing frequencies. In other words, the switching frequency may skip the frequency bands associated with the sensing frequencies during sweeping of the switching frequency across a range of frequencies (e.g., 100-400 KHz) in response to changes in the load and/or input voltage of the power supply.

Moreover, a halt command may be received (operation 510) from the portable electronic device. If the halt command is received, operation of the power supply is temporarily halted (operation 512) to further reduce common mode noise associated with sensing touch input on the portable electronic device. While operation of the power supply is halted, a change in the noise spectrum associated with the sensing frequency may be identified, thus allowing the touch control to more accurately detect touch input on the portable electronic device. Operation of the power supply may continue to be halted (operation 512) until a resume command is received (operation 514) from the portable electronic device. If the resume command is received, operation of the power supply is resumed (operation 516). Alternatively, operation of the power supply may resume automatically after operation has been halted for a pre-specified period.

Reduction of common mode noise may continue while the power supply is coupled to the portable electronic device (operation 518). During coupling of the power supply to the portable electronic device, the switching frequency of the power supply is managed based on the sensing frequencies of the touch control (operation 508), and operation of the power supply may be temporarily halted and resumed based on commands received from the portable electronic device (operations 510-516). Such operation of the power supply may continue until the power supply is no longer coupled to the portable electronic device.

Figure 6:
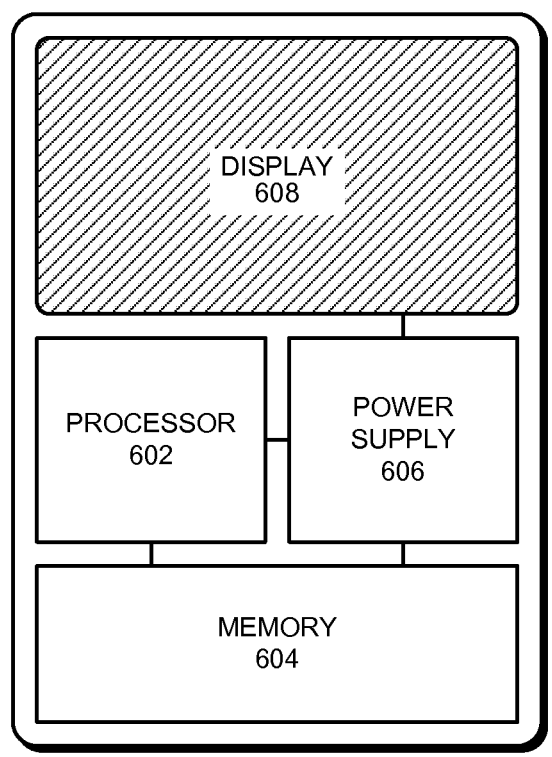
FIG. 6 shows a portable electronic device in accordance with the disclosed embodiments.

The above-described power supply can generally be used in any type of electronic device. For example, FIG. 6 illustrates a portable electronic device 600 which includes a processor 602, a memory 604 and a display 608, which are all powered by a power supply 606. Portable electronic device 600 may correspond to a laptop computer, tablet computer, mobile phone, PDA, portable media player, digital camera, and/or other type of battery-powered electronic device with a touchscreen, touchpad, and/or other touch-sensitive input device. Power supply 606 may include a flyback converter with a varying switching frequency.

To reduce common mode noise associated with sensing touch input on portable electronic device 600, an interface between portable electronic device 600 and power supply 606 may be used to detect coupling of power supply 606 to portable electronic device 600 through a set of wires. The set of wires may also be used to identify a type of power supply 606. Next, a switching frequency of power supply 606 may be determined based on the type of power supply 606 and a current drawn from power supply 606. Finally, the switching frequency may be used to facilitate the operation of a touch control in the portable electronic device. For example, if the switching frequency corresponds to the sensing frequency of the touch control, the sensing frequency of the touch control may be changed to an alternative sensing frequency.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the use of a portable electronic device, comprising:
   establishing a communications link between a power supply and the portable electronic device;
   using the communications link to identify a type of the power supply;
   periodically determining a switching frequency of the power supply based on the type of the power supply and a current drawn from the power supply; and
   using the switching frequency to facilitate the operation of a touch control in the portable electronic device,
   wherein using the switching frequency to facilitate the operation of a touch control in the portable electronic device comprises managing the switching frequency of the power supply based on one or more sensing frequencies to reduce common mode noise associated with sensing touch input on the portable electronic device.

2. The computer-implemented method of claim 1, wherein using the communications link to identify the type of the power supply involves:
obtaining an identifier corresponding to the type from an analog-to-digital converter (ADC) coupled to the communications link.

3. The computer-implemented method of claim 2, wherein the identifier is calculated by the ADC using one or more voltage dividers.

4. The computer-implemented method of claim 2, wherein periodically determining the switching frequency of the power supply based on the type of the power supply and the current drawn from the power supply involves:
using the identifier and the current to obtain the switching frequency from a lookup table.

5. The computer-implemented method of claim 1, wherein the communications link comprises a set of wires.

6. The computer-implemented method of claim 5, wherein the set of wires comprises:
a power wire;
one or more data wires; and
a ground wire.

7. The computer-implemented method of claim 1, wherein the touch control is associated with at least one of a touchscreen and a touchpad.

8. The computer-implemented method of claim 1, wherein using the switching frequency to facilitate the operation of the touch control in the portable electronic device involves:
if the switching frequency corresponds to a sensing frequency of the touch control, changing the sensing frequency to an alternative sensing frequency.

9. The computer-implemented method of claim 1, further comprising:
temporarily halting operation of the power supply upon receiving a halt command from the portable electronic device to the power supply, wherein the halted operation further reduces common mode noise associated with sensing touch input on the portable electronic device.

10. The computer-implemented method of claim 9, further comprising:
resuming operation of the power supply upon receiving a resume command from the portable electronic device to the power supply.

11. A system for facilitating the use of a portable electronic device, comprising:
an interface configured to establish a communications link between a power supply and the portable electronic device and
a management apparatus configured to:
use the communications link to identify a type of the power supply;
periodically determine a switching frequency of the power supply based on the type of the power supply and a current drawn from the power supply; and
use the switching frequency to facilitate the operation of a touch control in the portable electronic device,
wherein using the switching frequency to facilitate the operation of a touch control in the portable electronic device comprises managing the switching frequency of the power supply based on one or more sensing frequencies to reduce common mode noise associated with sensing touch input on the portable electronic device.

12. The system of claim 11, wherein using the switching frequency to facilitate the operation of the touch control in the portable electronic device involves:
if the switching frequency corresponds to a sensing frequency of the touch control, changing the sensing frequency to an alternative sensing frequency.

13. The system of claim 11, wherein the management apparatus correspond to at least one of a processor and a power-management unit (PMU).

14. The system of claim 11, wherein using the communications link to identify the type of the power supply involves:
obtaining an identifier corresponding to the type from an analog-to-digital converter (ADC) coupled to the communications link.

15. The system of claim 14, wherein periodically determining the switching frequency of the power supply based on the type of the power supply and the current drawn from the power supply involves:
using the identifier and the current to obtain the switching frequency from a lookup table.

16. The system of claim 11, wherein the communications link comprises a set of wires.

17. The system of claim 16, wherein the set of wires comprises:
a power wire;
one or more data wires; and
a ground wire.

18. The system of claim 11, wherein the management apparatus is further configured to:
temporarily halt operation of the power supply upon receiving a halt command from the portable electronic device to the power supply, wherein the halted operation further reduces common mode noise associated with sensing touch input on the portable electronic device.

19. The system of claim 18, wherein the management apparatus is further configured to:
resume operation of the power supply upon receiving a resume command from the portable electronic device to the power supply.

20. A computer-readable storage medium storing instructions that when executed by a computer cause the computer to perform a method for facilitating the use of a portable electronic device, the method comprising:
establishing a communications link between a power supply and the portable electronic device;
using the communications link to identify a type of the power supply;
periodically determining a switching frequency of the power supply based on the type of the power supply and a current drawn from the power supply; and
using the switching frequency to facilitate the operation of a touch control in the portable electronic device,
wherein using the switching frequency to facilitate the operation of a touch control in the portable electronic device comprises managing the switching frequency of the power supply based on one or more sensing frequencies to reduce common mode noise associated with sensing touch input on the portable electronic device.

21. The computer-readable storage medium of claim 20, the method further comprising:
temporarily halting operation of the power supply upon receiving a halt command from the portable electronic device to the power supply, wherein the halted operation further reduces common mode noise associated with sensing touch input on the portable electronic device.

22. The computer-readable storage medium of claim 21, the method further comprising:
resuming operation of the power supply upon receiving a resume command from the portable electronic device to the power supply.

23. The computer-readable storage medium of claim 20, wherein using the switching frequency to facilitate the operation of the touch control in the portable electronic device involves:
  if the switching frequency corresponds to a sensing frequency of the touch control, changing the sensing frequency to an alternative sensing frequency.

24. The computer-readable storage medium of claim 20, wherein using the communications link to identify the type of the power supply involves:
  obtaining an identifier corresponding to the type from an analog-to-digital converter (ADC) coupled to the wires.

25. The computer-readable storage medium of claim 24, wherein periodically determining the switching frequency of the power supply based on the type of the power supply and the current drawn from the power supply involves:
  using the identifier and the current to obtain the switching frequency from a lookup table.

26. The computer-readable storage medium of claim 20, wherein the communications link comprises a set of wires.

27. The computer-readable storage medium of claim 26, wherein the set of wires comprises:
  a power wire;
  one or more data wires; and
  a ground wire.

* * * * *